(12) United States Patent
Koffman et al.

(10) Patent No.: US 7,025,556 B1
(45) Date of Patent: Apr. 11, 2006

(54) AGRICULTURAL TRANSFER TABLE

(76) Inventors: Michael J. Koffman, N3270 Happy Rd., Campbellsport, WI (US) 53010; Arthur Beck, W1907 Hwy. F, Campbellsport, WI (US) 53010

(*) Notice: Subject to any disclaimer, the term of this patent is extended or adjusted under 35 U.S.C. 154(b) by 92 days.

(21) Appl. No.: 10/171,879

(22) Filed: Jun. 17, 2002

Related U.S. Application Data

(60) Provisional application No. 60/318,485, filed on Sep. 10, 2001.

(51) Int. Cl.
*B65G 67/24* (2006.01)

(52) U.S. Cl. .................. 414/346; 414/482; 414/502; 414/628

(58) Field of Classification Search ............... 414/481, 414/482, 528, 537, 346, 502
See application file for complete search history.

(56) References Cited

U.S. PATENT DOCUMENTS

| | | | |
|---|---|---|---|
| 2,321,168 A | 6/1943 | Tognetti | |
| 2,743,832 A | 5/1956 | Kappelmann | |
| 3,047,173 A | 7/1962 | Raney | |
| 3,047,174 A | 7/1962 | Kasten | |
| 3,150,885 A * | 9/1964 | Kucera | 280/479.1 |
| 3,173,563 A | 3/1965 | Finch | |
| 3,189,202 A | 6/1965 | Hansen | |
| 3,265,232 A * | 8/1966 | Lythgoe | 414/482 |
| 3,286,862 A * | 11/1966 | Hansen | 414/502 |
| 3,345,042 A * | 10/1967 | Ryan | 366/131 |
| 3,424,323 A * | 1/1969 | Barnaby | 414/537 |
| 3,455,608 A * | 7/1969 | Van Der Lely | 406/80 |
| 3,473,679 A | 10/1969 | Weichel | |
| 3,512,668 A | 5/1970 | Raitch | |
| 3,610,442 A | 10/1971 | Butler et al. | |
| 3,635,359 A | 1/1972 | Fisher | |
| 3,706,389 A | 12/1972 | Grey et al. | |
| 3,794,198 A | 2/1974 | Buchele et al. | |
| 3,811,584 A | 5/1974 | Grey et al. | |
| 3,819,072 A | 6/1974 | Reed | |
| 3,873,032 A * | 3/1975 | Jellis, Jr. | 239/658 |
| 3,926,378 A * | 12/1975 | Ryan | 241/154 |
| 3,999,674 A * | 12/1976 | Meitl | 414/485 |
| 4,049,145 A * | 9/1977 | Downing et al. | 414/502 |
| 4,082,198 A | 4/1978 | Anderson et al. | |

(Continued)

FOREIGN PATENT DOCUMENTS

DE 33 06 903 A1 * 8/1984
EP 0014 154 * 1/1980

*Primary Examiner*—Thomas J. Brahan
(74) *Attorney, Agent, or Firm*—Ryan Kromholz & Manion, S.C.

(57) ABSTRACT

An agricultural transfer table enables rapid transfer of harvested agricultural material from a dump truck to a silo or the like. The agricultural transfer table comprises a box with an open front end. Apron chains in the box propel the material to the box back end, where cross chains discharge the material out a selected side. A prime mover and hydraulic system are part of the agricultural transfer table, so no source of external power is required to operate it. A tongue is closeable to enable the agricultural transfer table to be towed by a tractor. The tongue is openable to allow the truck to back up close to the agricultural transfer table front end. The front end is tiltable downwardly toward the ground. The truck back wheels back up ramps at the front box end. The ramps are storable inside the box when the agricultural transfer table is towed.

33 Claims, 10 Drawing Sheets

U.S. PATENT DOCUMENTS 4,091,972 A * 5/1978 Krueger et al. ............. 222/627
4,531,880 A * 7/1985 Paques ...................... 414/473
4,711,428 A * 12/1987 Carpenter ................... 254/423
5,012,631 A * 5/1991 Hostetler et al. ............ 53/588

* cited by examiner

AGRICULTURAL TRANSFER TABLE

This application claims the benefit of U.S. Provisional Application No. 60/318,485 filed Sep. 10, 2001.

BACKGROUND OF THE INVENTION

1. Field of the Invention

This invention pertains to agricultural equipment, and more particularly to apparatus that transfers agricultural products from a wheeled vehicle to a blower or similar conveying implement.

2. Description of the Prior Art

Various types of machines have been developed to harvest agricultural crops. A harvesting machine often loads the picked crop into a box of a vehicle that travels in the field along with the machine. When the vehicle box is full, it is driven to a barn or similar site for unloading. After the vehicle has been emptied, it returns to the field for another load, and the loading-unloading cycle repeats.

Vehicles that carry and unload harvested crops are available with a wide variety of structural and operational features. Some prior crop carrying and unloading vehicles had apron chains that propelled the crop in the box in a longitudinal direction. Some prior vehicles also had cross chains or augers that discharged the crop out one or other side of the box. Typical examples of chain and auger type unloading vehicles may be seen in U.S. Pat. Nos. 2,321,168; 2,743,832; 3,047,173; 3,047,174; 3,173,563; 3,189,202; 3,286,862; 3,512,668; 3,873,032; 3,819,072; and 4,049,145.

A common characteristic of the vehicles of the foregoing patents was that they were not self-powered. Rather, they were in the form of wagons that were pulled from place to place by a powered vehicle such as a tractor. In addition, an external source of power was required to operate the wagon apron chains or other unloading mechanisms. Typically, the unloading mechanisms of the wagons were connected to a power take-off unit of the tractor.

Prior wagons with cross chains or augers were suitable for unloading a crop in a concentrated stream to a blower, conveyor, or similar conveying implement that is commonly used to fill a silo. However, the speed with which the prior wagons could unload was undesirably slow. Another major limitation, as mentioned, was the lack of power on the wagon itself for operating the unloading mechanism. With some crops and operating conditions, the power available from a tractor was only marginally sufficient. In those situations, there was a danger that the tractor could overheat or otherwise be damaged. As a result, the wagon-tractor combination for carrying and unloading crops was not entirely satisfactory.

The use of trucks with large boxes for carrying harvested crops from a field to a storage location is becoming increasingly common, because trucks have increased versatility and economy compared with tractors and wagons. However, trucks for carrying and unloading agricultural crops possess an important disadvantage. That disadvantage is based on the fact that a truck cannot conveniently unload the crop in a small and concentrated stream onto a blower or conveyor. Merely dumping the truck box is not acceptable, because a truck can dump its load much faster than a blower or other implement can move the material away. In addition, the material falls from a truck box across its entire width, not in a concentrated stream. Consequently, trucks cannot be used to transfer the crop to conventional blowers or other conveying implements unless the farmer is willing to tolerate either a large amount of spillage or a lengthy wait for a person to carefully and slowly hand shovel the crop onto the blower. The wait for the truck to be unloaded by hand represents unproductive use of both the truck and its driver.

The Meyer Manufacturing Corporation of Dorchester, Wis., markets a forage box with apron chains that is suitable for use with a self-propelled vehicle, such as a large truck. Power to operate the apron chains is available directly from the truck such that the forage box and truck constitute a self-contained crop carrying and unloading system.

Thus, a need exists for improvements in transferring harvested crops to storage locations.

SUMMARY OF THE INVENTION

In accordance with the present invention, an agricultural transfer table is provided that greatly improves the efficiency of harvesting and storing crops. This is accomplished by apparatus that enables a truck to rapidly dump its load at an unloading station and then return to a field while the agricultural transfer table transfers the crop to a conventional blower or other conveying implement.

The agricultural transfer table is comprised of a chassis to which is mounted a large box. The box has a bed, a back wall, and sidewalls. The front end of the box is open. The chassis back end is supported on the ground by wheels. Near the chassis front end is a jack. In the preferred embodiment, the jack is operable between an extended position and a retracted position. When in the extended position, the jack supports the chassis front end off the ground such that the bed is approximately horizontal. When the jack is in the retracted position, it supports the chassis such that the front end is closer to the ground than the back end, i.e., the bed tilts downwardly toward its front end.

The chassis front end has a tongue that is engageable with a towing vehicle. In the embodiment of the invention having a retractable and extendable jack, the tongue is openable and closeable. For that purpose, the tongue has two arms each having a first end that is pivotally connected to the chassis. The second ends of the arms are interlockable to a hitch block. When the tongue is closed, the tongue functions in a normal manner for towing the agricultural transfer table by a tractor or similar vehicle. When desired, the tongue arms second ends are unlocked from the hitch block. The arms are pivotable almost 180 degrees such that they are under the bed.

The agricultural transfer table further comprises apron chains for propelling material in the box toward the back end. At the back end of the box is a cross bed and cross chains. The cross bed and cross chains receive the material from the apron chains and discharge the material out either side of the box.

Further in accordance with the present invention, a pair of ramps are hinged to the chassis at the front end thereof. Each ramp has a wheel support section and a pair of lugs. The lugs are hinged to the chassis for rotating through approximately 180 degrees between a working location and a storage location. When the ramps are at their working locations, the wheel support sections rest on the ground. When the ramps are at the storage locations, the wheel support sections rest upside down on the bed. Rotation of the ramps is by pins fixed to the chassis and passing through slots in the lugs.

In the preferred embodiment, the agricultural transfer table includes a power source for operating the apron chains and cross chains. Specifically, the agricultural transfer table includes an internal combustion engine and a hydraulic system. The hydraulic system has a pump that supplies pressurized fluid to various motors and associated control valves. Accordingly, no source of power external to the agricultural transfer table itself is required to operate it.

In operation, the agricultural transfer table is towed by means of the closed tongue to a desired transfer station. The ramps are in their storage locations while the agricultural transfer table is towed. A blower or similar implement is located adjacent the cross chains on the desired side of the agricultural transfer table. The jack is operated to its extended position to support the chassis front end on the ground. The towing vehicle is disengaged from the tongue and departs. The tongue is opened by unlocking the hitch block from the arms and pivoting the arms under the bed. Then the jack is operated to its retracted position. Doing so causes the chassis and bed to tilt downwardly toward the front end until the front end of the bed is only a few inches above the ground. The ramps are rotated 180 degrees from their storage locations on the bed to there working locations whereat the wheel support sections rest on the ground. The slots in the ramp lugs enable the ramps to accommodate different amounts of tilt of the chassis relative to the ground and also uneven ground surfaces. The engine is turned on, and the agricultural transfer table is ready.

A truck loaded with silage or other harvested crop backs up to the front end of the agricultural transfer table. The truck rear wheels drive up the ramps such that the back of the truck box is well inside the agricultural transfer table box.

The truck dumps its load onto the agricultural transfer table bed and immediately departs for another load. Engaging the agricultural transfer table apron and cross chains discharges the crop material in a concentrated stream to the blower or other conveying implement in a controlled fashion without spillage. In that manner, trucks can deliver harvested material to the transfer station and dump it without delay. In addition, the agricultural table requires no source of external power for operation, thus freeing tractors and other expensive machinery for other duty.

When the transfer operation is complete, the ramps are rotated back to their storage locations. The jack is operated to raise the chassis and bed front end. After the tongue is closed, the agricultural transfer table is ready to be towed to its next transfer station.

The method and apparatus of the invention, using a self-contained power source, thus efficiently transfers harvested agricultural crops from a truck to a blower or similar conveying implement. The necessity of the truck having to wait for the blower to convey the material from the truck to a silo is eliminated, even though the entire operation is carried out with little, if any, spillage.

Other advantages, benefits, and features of the present invention will become apparent to those skilled in the art upon reading the detailed description of the invention.

DETAILED DESCRIPTION OF THE INVENTION

Figure 1:
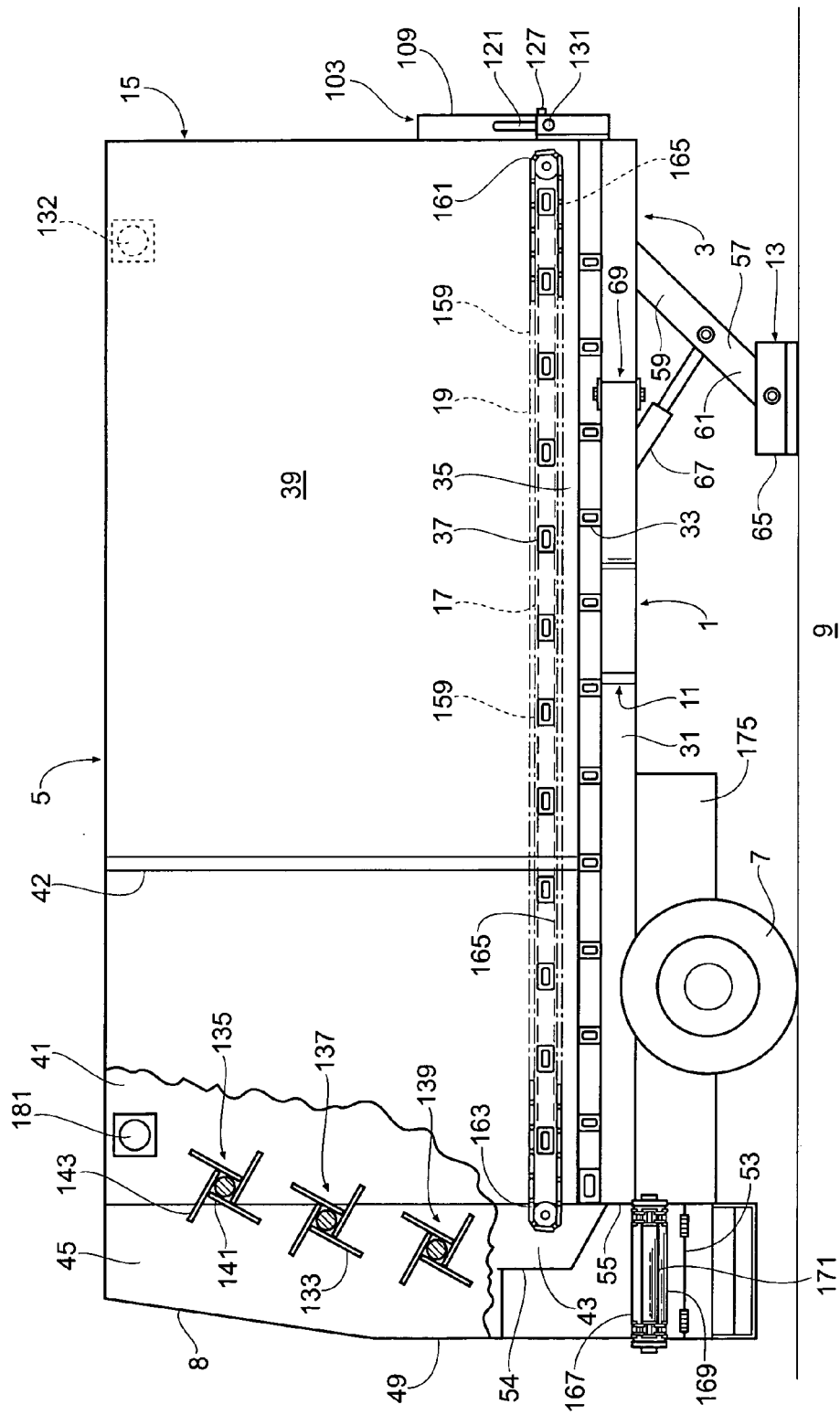
FIG. 1 is a simplified left side view of the agricultural transfer table of the invention partially broken to show a portion of the right side wall and right extension and showing the tongue in the open position and the ramps in the stored locations.
Figure 1A:
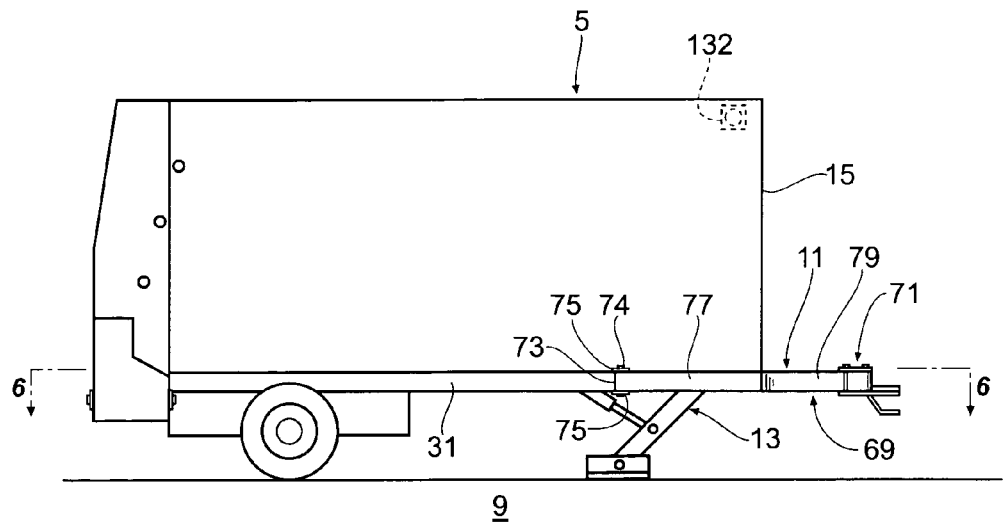
FIG. 1A is a simplified left side view of the agricultural transfer table showing the tongue in the closed position.

Although the disclosure hereof is detailed and exact to enable those skilled in the art to practice the invention, the physical embodiments herein disclosed merely exemplify the invention, which may be embodied in other specific structure. The scope of the invention is defined in the claims appended hereto.

Referring first to FIGS. 1–5 and 9, an agricultural transfer table 1 is illustrated that includes the present invention. The agricultural transfer table 1 is particularly useful in the process of transferring harvested crops from a field to a storage location such as a farm silo. However, it will be understood that the invention is not limited to agricultural applications.

General

The agricultural transfer table 1 is comprised of a chassis 3 to which is mounted a box 5. Wheels 7 support the chassis 3 near the agricultural transfer table back end 8 for rolling over the ground 9. The agricultural transfer table is towed by a tractor or other powered vehicle 99 by means of a tongue 11. A jack 13 supports the chassis off the ground 9 near the agricultural transfer table front end 15.

The box 5 includes a bed 17. Apron chains 19 on the bed 17 propel agricultural material in the box toward the back end 8, arrow 21. At the back end of the agricultural transfer table is a cross bed 23 and cross chains 25. The cross bed 23 and cross chains 25 receive the material from the bed 17 and apron chains 19 for discharging the material out a selected side of the agricultural transfer table, arrows 27 or 29.

The jack 13 is operable between an extended position and a retracted position. When the jack is in the extended position, the bed 17 is generally horizontal. When the jack is in the retracted position, the bed is tilted downwardly toward the front end 15, FIG. 12. Before the jack is operated to tilt the bed, the tongue 11 is opened.

Chassis and Box

Figure 6:
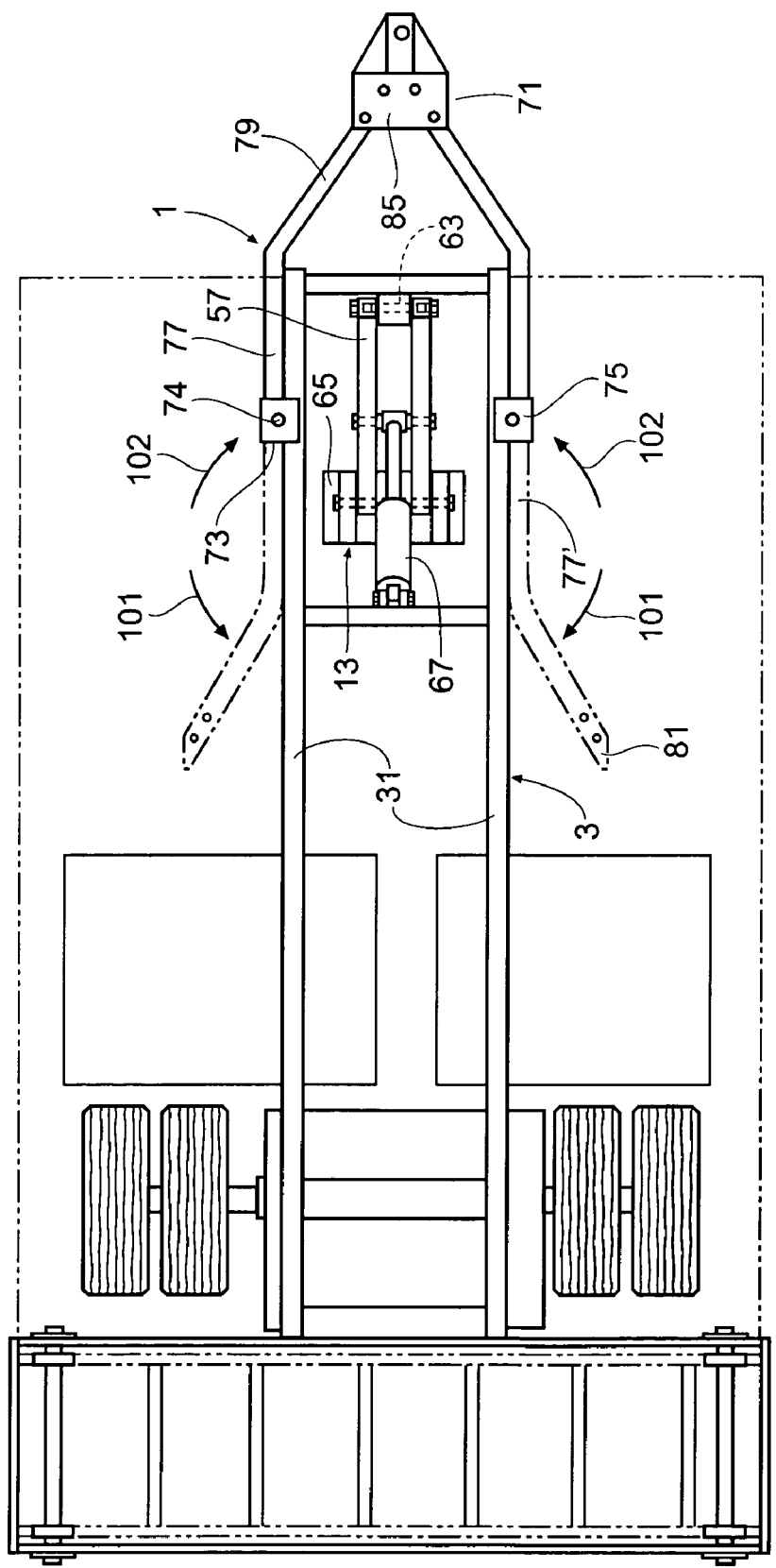
FIG. 6 is a cross-sectional view taken along line 6—6 of FIG. 1A.

Looking also at FIG. 6, the chassis 3 and box 5 are preferably made of welded steel construction. The chassis is comprised of a pair of lowermost longitudinal tubes 31 that extend almost the full length of the agricultural transfer table 1. The pair of lowermost tubes 31 support a number of lower transverse tubes 33 that are as long as the agricultural transfer table is wide. In turn, the lower transverse tubes 33 supports several upper longitudinal tubes 35. Uppermost transverse tubes 37 are supported on the upper longitudinal tubes 35. The bed 17 of the box is mounted on the chassis uppermost transverse tubes 37.

The box 5 further includes a left sidewall 39 and a right side wall 41. The sidewalls 39 and 41 extend for the full length of the chassis 3. The sidewalls may be constructed as relative thin steel sheets welded to upright posts 42, which in turn are welded to the chassis tubes 33, 35, and 37. For clarity, many of the posts 42 are not shown in the various figures.

In the illustrated construction, there is a left extension 43 welded to the box left wall 39 at the back end 8 of the agricultural transfer table 1. A similar right extension 45 is welded to the box right wall 41. A back wall 49 between the extensions 43 and 45 has a lower edge 51 that is below the level of the bed 17. The back wall 49 closes the lower portion of the box back end. A bottom wall 53 connects between the back wall lower edge 51 and a vertical intermediate wall 55. The vertical intermediate wall 55 is joined to the back ends of the chassis lowermost longitudinal tubes 31. Each extension defines a cutout 54. Each cutout 54 extends horizontally for the width of the associated extension between the back wall 49 and the intermediate vertical wall 55. Each cutout extends vertically from the bottom wall 53 to approximately the level of the bed 17. The box at the front end 15 of the agricultural transfer table is open.

The cross bed 23 is between the level of the bed 17 and the box bottom wall 53. The width of the cross bed is between the box back wall 49 and the vertical intermediate wall 55. The cross bed length is between the extensions 43 and 45.

A pair of guards 56, 56A are hinged to the box bottom wall 53, one on each side of the agricultural transfer table 1. Each guard 56, 56A has a bottom panel 58, and a side panel 60 joined at a right angle to the bottom panel. The free end of each bottom panel 58 is hinged at a hinge 62 to the box bottom wall for swinging in the directions of arrows 64.

Figure 2:
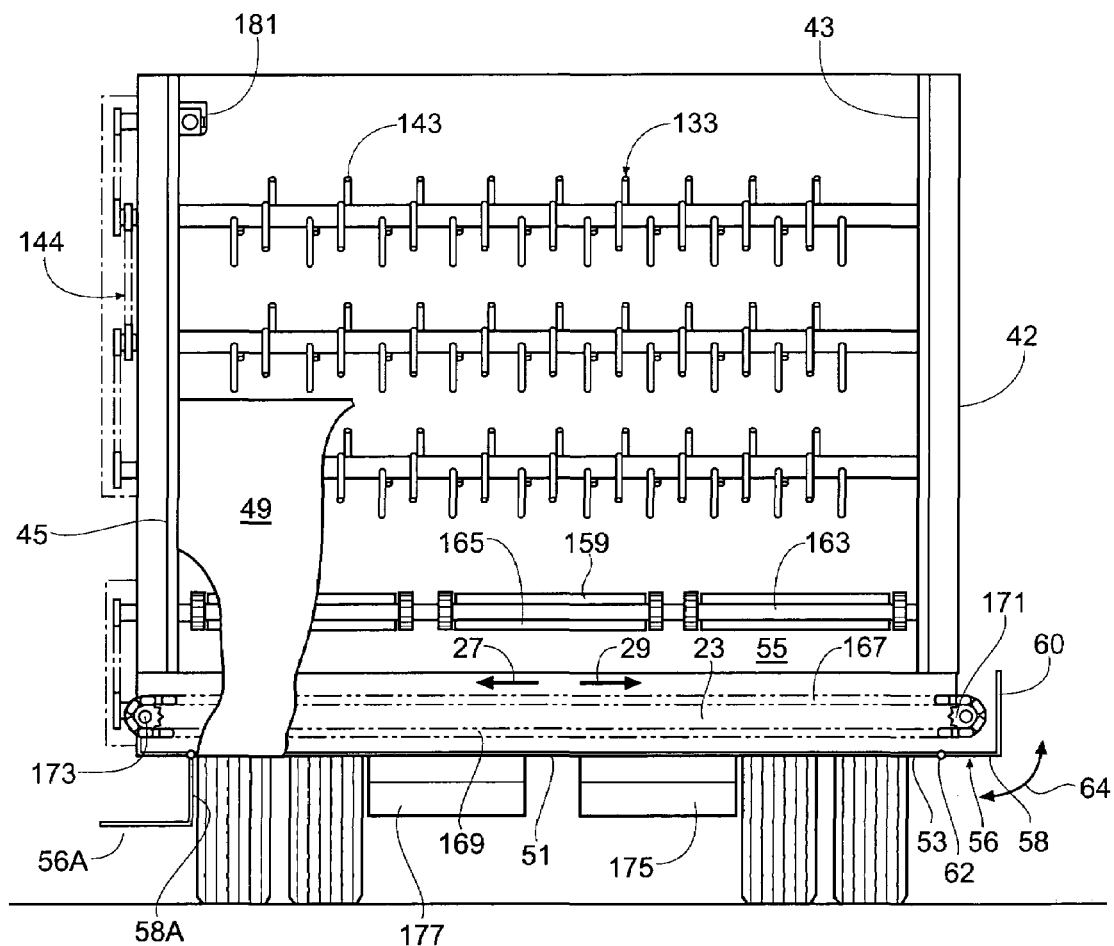
FIG. 2 is a broken back view of the agricultural transfer table.
Figure 3:
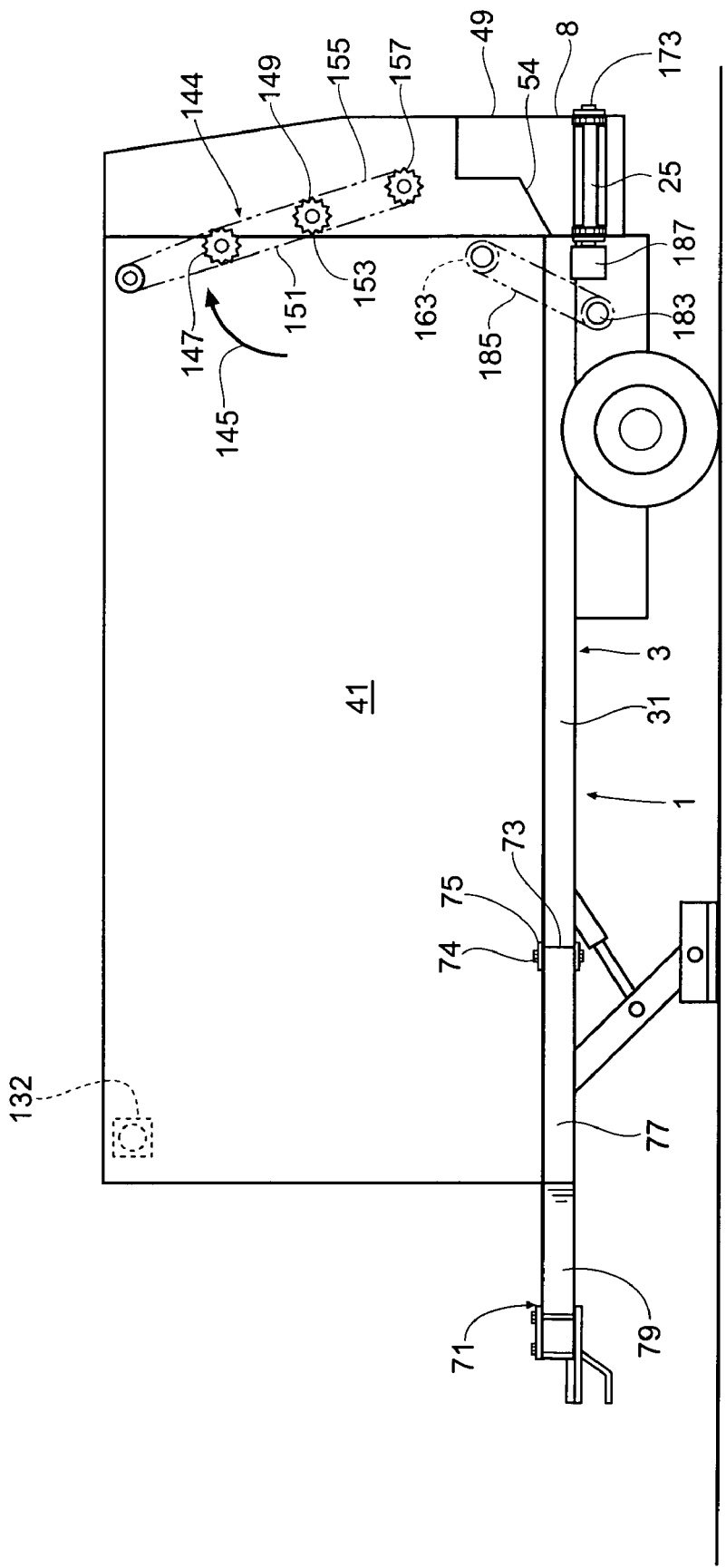
FIG. 3 is a simplified right side view of the agricultural transfer table.
Figure 4:
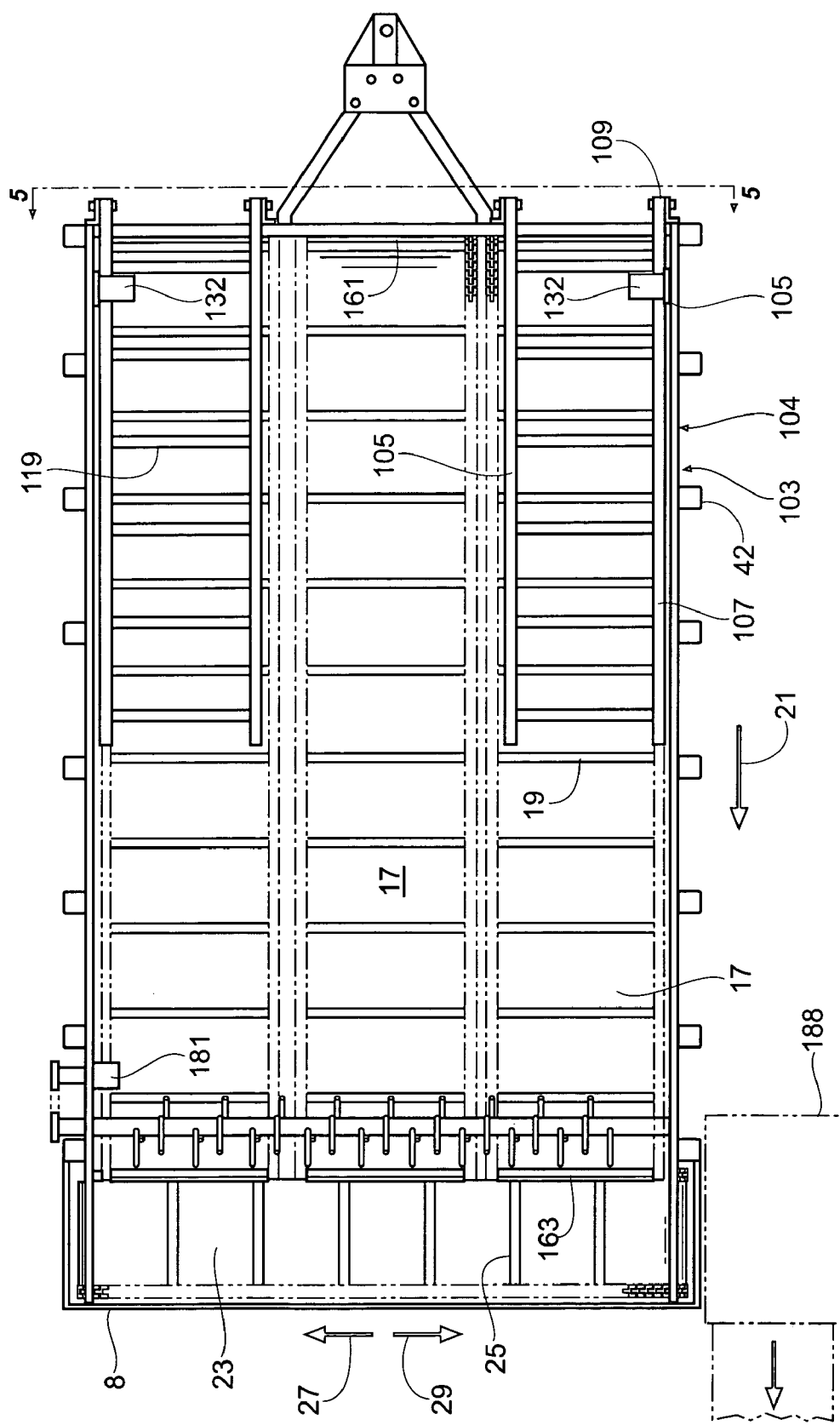
FIG. 4 is a top view of the agricultural transfer table showing the ramps in the storage locations.
Figure 5:
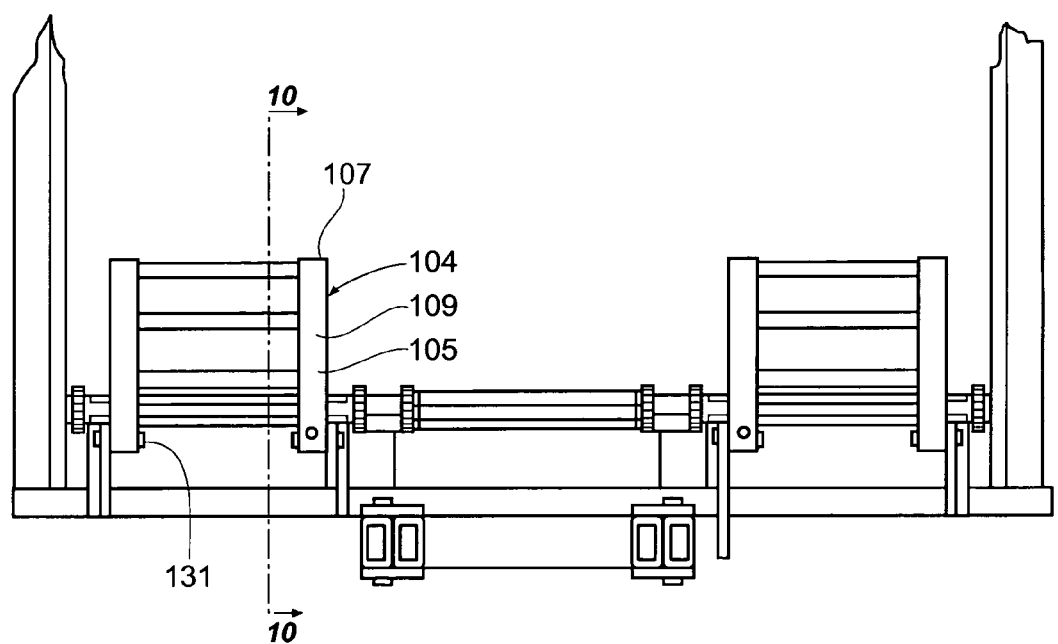
FIG. 5 is a partial view taken along line 5—5 of FIG. 4.

The guards 56, 56A swing between an operative position and an open position. In FIG. 2, the guard 56 is shown in the operative position. When in the operative position, the guard bottom panel 58 is parallel to the box bottom wall 53, and the guard side panel 60 covers a substantial part of the cutout 54 in the box extension 43. A fastener, not shown, retains the guard 56 in its operative position to the box back wall 49. When the guard 56 is swung to the open position, as is shown by guard 56A, the bottom panel 58A is approximately perpendicular to the box bottom wall. In that situation, the cutout in the extension is completely uncovered.

Jack

In the preferred embodiment, the jack 13 is comprised of a sturdy beam 57 having an upper end 59 and a lower end 61. The beam upper end 59 is pivotally mounted to the chassis 3, as by a large rod 63. On the beam lower end 59 is a thick plate 65. A hydraulic ram 67 connects between the beam 57 and the chassis.

Operation of the jack ram 67 causes the beam 57 to pivot between extended and retracted positions. When the beam is in the extended position, the bed 17 is generally horizontal. When the beam is in the retracted position, the bed tilts downwardly toward the agricultural transfer table front end 15.

Tongue

In the particular construction illustrated in which the agricultural transfer table 1 is equipped with the extendable and retractable jack 13, the tongue 11 is capable of opening and closing. For that purpose, the tongue is comprised of two arms 69 and a hitch block 71. One end 73 of each arm 69 is pivotally connected by a pin 74 between two plates 75 that are welded to the outside of an associated chassis longitudinal tube 31. Each arm has a first length 77 adjacent the first end 73, and a second length 79 that is at an angle to the first length. The arms are capable of pivoting approximately 180 degrees about the respective pins 74 in the directions of arrows 101 and 102, FIG. 6. Pivoting of the arms in both directions is limited by contact of the arms first lengths 77 with the chassis tubes 31, as is shown at reference numeral 77'.

Figure 7:
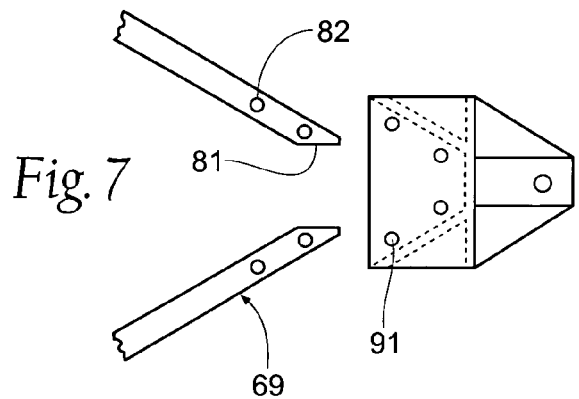
FIG. 7 is an exploded top view of the tongue showing it in a partially open position.
Figure 8:
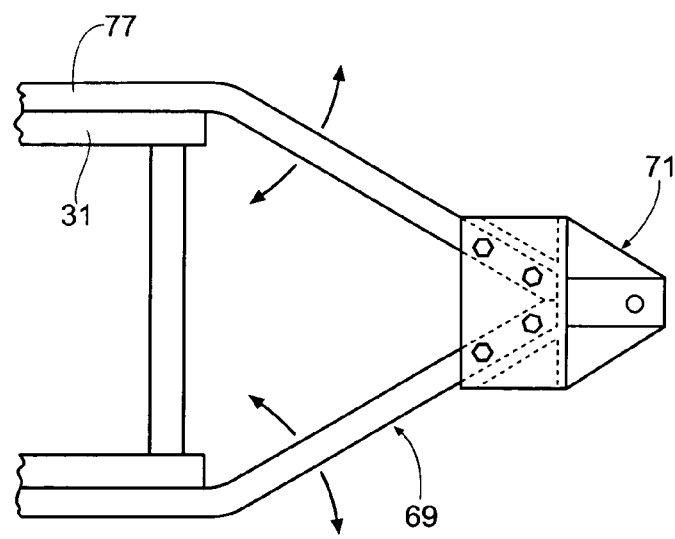
FIG. 8 is a top view of the tongue in the closed position.
Figure 9:
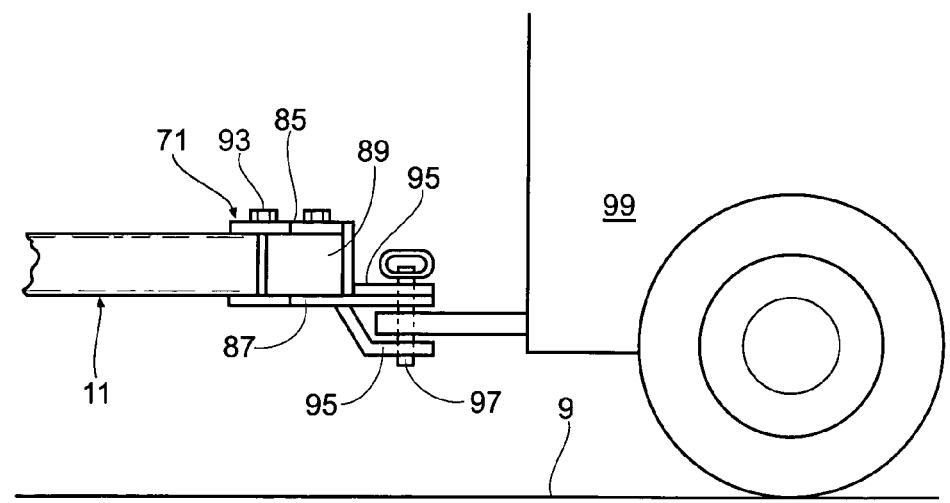
FIG. 9 is a view showing the agricultural transfer table being towed by a tractor.
Figure 10:
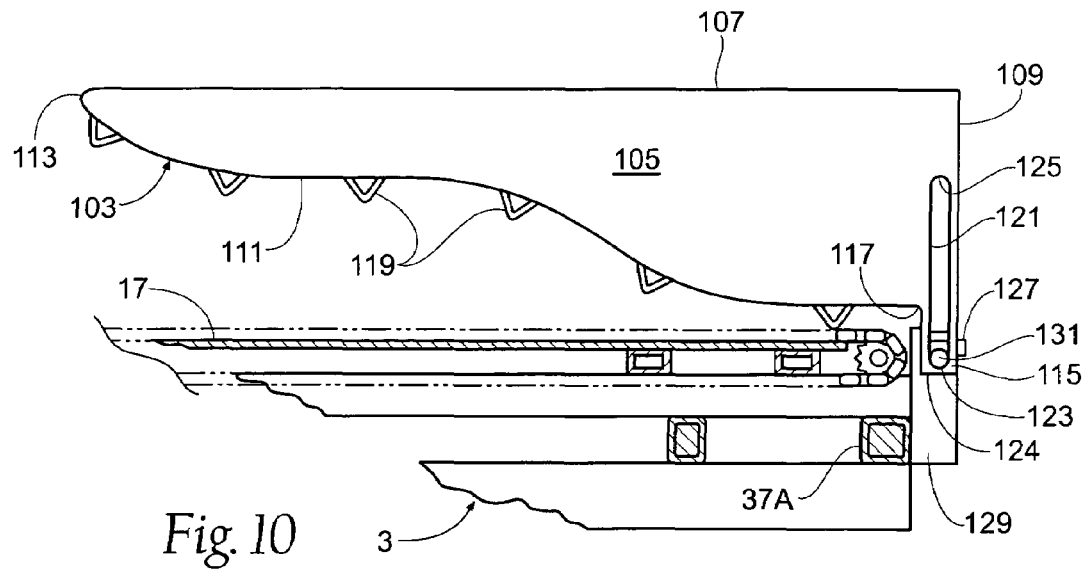
FIG. 10 is a view on an enlarged scale taken along line 10—10 of FIG. 5.

Looking also at FIGS. 7 and 8, each tongue arm 69 has a second end 81. There are a pair of holes 82 through each arm near its second end 81. In FIGS. 8 and 9, the tongue second ends are shown connected to each other by the hitch block 71. In that situation, the tongue is closed, and the first lengths 77 of the arms lie alongside the chassis longitudinal tubes 31 near the agricultural transfer table front end 15. FIG. 7 shows the tongue in a slightly open position. In the fully open position, the arms first lengths 77 lie alongside the chassis longitudinal tubes 31 between the pins 74 and the agricultural transfer table back end 8, as is shown by reference numeral 77'.

When the tongue 11 is closed, the arms 69 are interlocked by the hitch block 71. In the particular construction illustrated, the hitch block has top and bottom plates 85 and 87, respectively, separated by spacer plates 89. Two or more holes 91 are aligned in the top and bottom plates 85 and 87, respectively. The hitch block is removeably interlockable to the arms by pins 93 that pass through the holes 91 in the hitch block and the holes 82 in the arms. The hitch block has a pair of forward horizontal plates 95 with holes that receive a draw pin 97. The agricultural transfer table 1 is towed over the ground 9 by the tractor or other powered vehicle 99 by means of the hitch block plates 95 and the draw pin 97.

To open the tongue 11, the pins 93 are removed from the hitch block 71 and the arms 69, and the hitch block is removed from the arms. The arms are pivoted approximately 180 degrees about the pins 74 in the directions of arrows 101 until the arms first lengths are at their respective positions 77'.

Ramps

With particular attention to FIGS. 1, 4, 5, 10, and 11, the agricultural transfer table 1 further comprises a pair of ramps 103. Each ramp 103 has a wheel support section 104 comprised of a pair of spaced parallel plates 105. Each plate 105 has a bottom edge 107, a back edge 109, and a top edge 111. The bottom and back edges 107 and 109, respectively, may be straight and perpendicular to each other. The top edge 111 has a first end 113 that joins to the bottom edge. The top edge may be straight, but it preferably has a compound convex-concave shape as is shown in the drawings.

The two plates 105 of each ramp 103 are tied together by several crosspieces 119. As illustrated, the crosspieces 119 are in the form of angles, with the free ends of the angle legs being welded to the top edges 111 of the plates. Preferable dimensions for the plates are a length of approximately eight feet and a distance of approximately two feet between the bottom edge 107 and the top edge back end 117. A spacing of approximately 30 inches between the plates is satisfactory.

A lug 115 is between the back end 117 of the top edge 111 and the back edge 109 of each plate 105. In each lug 115 is a slot 121 that is parallel to the plate back edge. The slot 121 has an upper end 123 near a top end 124 of the lug, and a bottom end 125 near the bottom edge 107 of the plate. A cross pin 127 is removeably insertable through each lug and slot near the slot upper end 123.

The ramps 103 are hinged to the agricultural transfer table chassis 3 at the front end 15. For that purpose, two pairs of uprights 129 are welded to the chassis frontmost transverse tube 37A. The uprights 129 of each pair are spaced apart a little wider than the width of the ramps. A fixed pin 131 is held between the uprights of each pair and passes through the slots 121 of a ramp. The cross pins 127 are so located relative to the slots upper ends 123 that they capture the fixed pins 131 against the slots upper ends.

Figure 12:
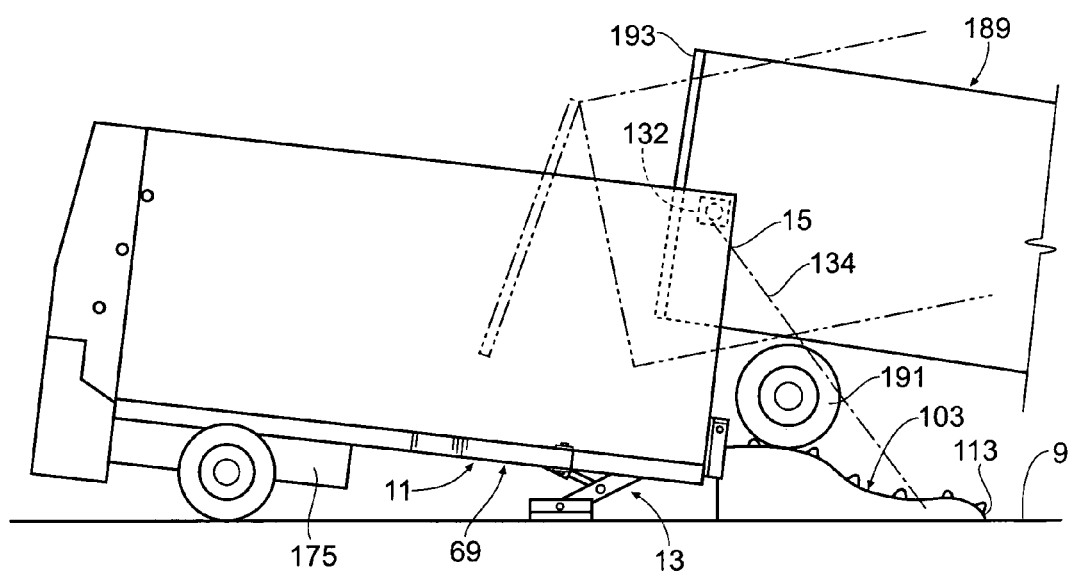
FIG. 12 is a simplified left side view of the agricultural transfer table in operation.
Figure 11:
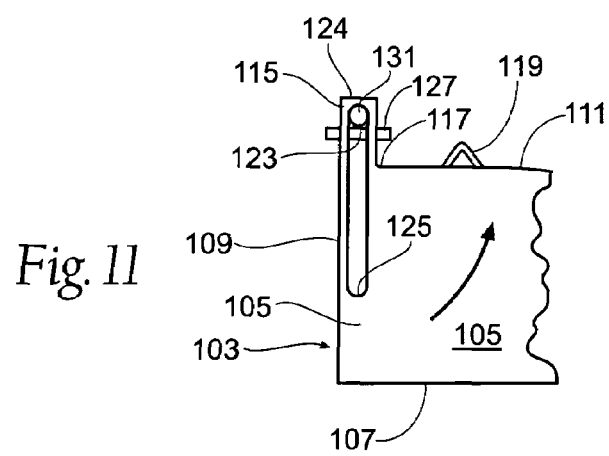
FIG. 11 is a partial view of a ramp in the working location.

In FIGS. 11 and 12, the ramps 103 are shown in a working location. When in the working location, the ramps project forwardly of the agricultural transfer table front end 15. When the ramps are at a storage location they are inside the agricultural transfer table 1, FIGS. 1, 4, 5, and 10. When the ramps are in their storage locations, the crosspieces 119 rest on the bed 17. Rotating the ramps between the working and storage locations is achieved by rotating them about the fixed pins 131. Because of the large size and weight of the ramps, they are rotated by means of respective winches 132 mounted to the chassis side walls 39 and 41. Cables 134 connect the winches 132 to the associated ramps.

Beaters

The agricultural transfer table 1 further comprises a beater system 133. In the particular agricultural transfer table shown, the beater system 133 has three beaters 135, 137, and 139, but more or fewer beaters can be used. Each beater 135, 137, and 139 is comprised of a long shaft 141 joined to the left and right extensions 43 and 45, respectively, or to the left and right side walls 39 and 41, respectively, of the box 5. A number of tines 143 are welded to each shaft 141.

The beaters 135, 137, and 139 are interconnected by a drive train 144 for rotating at different speeds in the same direction of arrow 145. The drive train 144 is made up of a drive sprocket 147 on the shaft 141 of the beater 135, and a smaller driven sprocket 149 on the shaft of the beater 137. A first chain 151 is trained over the drive and driven sprockets 147 and 149, respectively. There is another drive sprocket 153 on the shaft of the beater 137. The drive sprocket 153 is larger than the driven sprocket 149 on that beater shaft. A second drive chain 155 is trained over the drive sprocket 153 and over a smaller driven sprocket 157 on the shaft of the beater 139. Thus, turning the shaft of the beater 135 causes the beaters 137 and 139 to turn in the same direction, with the beater 137 turning faster than the beater 135, and the beater 139 turning faster than the beater 137.

Chains

The apron chains 19 have a top flight 159 that slides along the bed 17 in the direction of arrow 21. The apron chains are guided over a front shaft and sprockets 161 at the front end 15 of the agricultural transfer table 1 and over a similar rear shaft and sprocket 163 at the back end 8. The return flight 165 of the apron chains is located under the bed between the chassis transverse tubes 33 and 37.

The cross chains 25 have a top flight 167 that is on top of the cross bed 23, and a return flight 169 that is between the cross bed and the box bottom wall 53. The cross chains are guided by similar left and right shafts and sprockets 171 and 173, respectively, on the left and right sides of the agricultural transfer table 1.

Power System

It is an important feature of the present invention that the agricultural transfer table 1 is completely self-contained in the sense that no external source of power is required to operate it. To power the agricultural transfer table, it is equipped with a prime mover, such as an internal combustion engine schematically represented at reference numeral 175. For example, the engine 175 may be a diesel engine. The engine includes a fuel tank, battery, and other well-known components that are necessary to run an engine.

Figure 13:
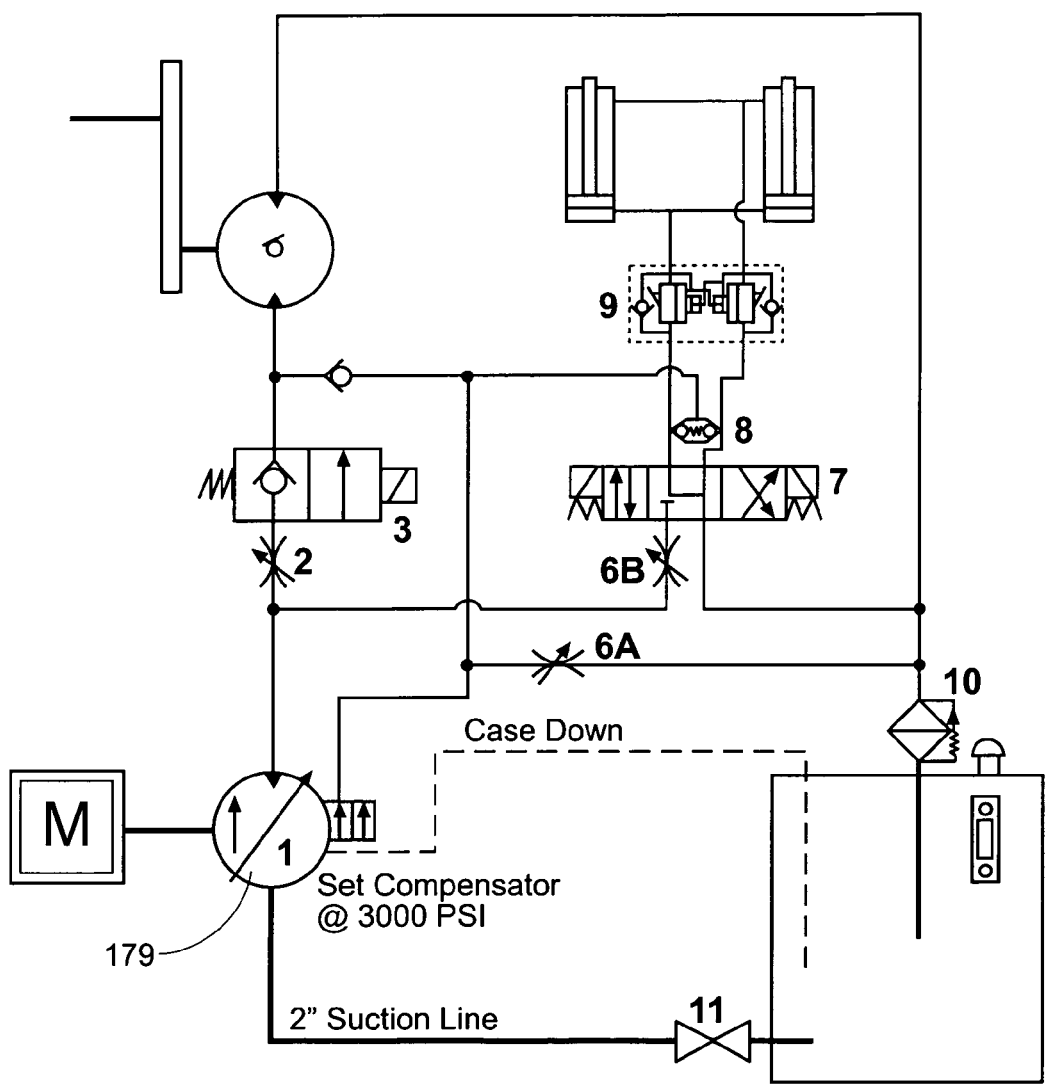
FIG. 13 is a schematic view of the hydraulic system of the agricultural transfer table.

The engine 175 drives a hydraulic system 177. Also see FIG. 13. Specifically, the engine operates a hydraulic pump 179 that supplies several hydraulic motors with hydraulic fluid under pressure. A first hydraulic motor 181 is mounted to the box sidewall 41 and connects to the drive train 144 of the beater system 133.

A second hydraulic motor 183 is mounted to the chassis 3 near the back 8 end of the agricultural transfer table 1. The hydraulic motor 183 is connected to the back shaft and sprocket 163 of the apron chains 19 by a chain and sprockets 185.

A third hydraulic motor 187 is mounted to the chassis 3 and drives the shaft and sprockets 173 for the cross chains 25. The direction of rotation of the shaft and sprockets 173 is reversible by reversing the hoses, not shown but well known to persons skilled in the art, between the pump 179 and the hydraulic motor 187. In that manner, the direction 27 or 29 of the cross chains 25 is selected. The hydraulic system 177 may include the ram 67 of the jack 13. In that case, appropriate valves control the extension and retraction of the jack in response to operating the hydraulic system. Alternately, the jack ram may be manually operated by means of a hand pump that is independent of the hydraulic system.

Operation

The agricultural transfer table 1 functions to transfer forage, corn, and other agricultural crops from a truck to a blower or other conveying implement that in turn is used to fill a silo or similar storage space. To do so, the ramps 103 are initially in their storage locations, FIG. 10. Both guards 56, 56A are in their operative positions, fastened to the agricultural transfer table back wall 49. A tractor 99 or similar towing vehicle engages the tongue 11 by means of the draw pin 97 and hitch block 71. The jack 13 is operated to its retracted position by means of the ram 67. The tractor tows the agricultural transfer table to the desired transfer station. The jack is then operated to its extended position to support the agricultural transfer table front end 15 off the ground 9. The tractor is disengaged from the tongue 11 and departs for working elsewhere.

The tongue 11 is opened by removing the pins 93 from the arms 69 and hitch block 71. If desired, the hitch block can remain pinned to one of the arms. The arms are pivoted in the directions of arrows 101 until the first lengths 77 lie alongside the chassis longitudinal tubes 31, as shown at reference numerals 77'. Then the jack ram 67 is operated to retract the jack 13. As a result, the front end 15 of the agricultural transfer table 1 tilts downwardly toward the ground 9. Normally, the jack is retracted until the chassis frontmost transverse tube 37A contacts the ground. The ramps 103 are rotated to their working locations, FIGS. 11 and 12, by means of the winches 132 and cables 134. When the ramps are initially at their working locations, only their front ends 113 contacts the ground. However, removing the cross pins 127 enables the ramps slots 121 to slide past the fixed pins 131 until the ramps bottom surfaces 107 rest flat on the ground. In that manner, the slots enable the ramps to accommodate different amounts of tilt and also uneven contours of the ground.

The operator decides which side of the agricultural transfer table 1 he wants the agricultural material to be discharged. He arranges the hydraulic hoses to the hydraulic motor 187 for the cross chains 25 accordingly. He unfastens the appropriate guard 56 or 56A from the back wall 49 and swings it to its open position. The other guard remains in its operative position. A conventional conveying implement, such as a blower 188, is positioned adjacent the cutout 54 on the desired side of the agricultural transfer table and the open guard.

A conventional dump truck 189 loaded with harvested agricultural material backs up to the agricultural transfer table front end 15. The truck rear wheels 191 drive up the ramps 103 until the truck rear gate 193 is located well into the agricultural transfer table box 5. The truck 189 then dumps its load and departs.

The engine 175 is turned on. The hydraulic system 177 is controlled to run the hydraulic motors 181, 183, and 187. The result is that the apron chains 19 propel the material in the direction of arrow 21 toward the cross chains 25, which discharge the material out the cutout 54 on the desired side of the agricultural transfer table 1. The beaters 135, 137, and 139 rotate at different speeds to help control the movement of the material. The entire load discharges from the agricultural transfer table as a concentrated stream in a controlled but rapid manner, and the box 5 is again ready to receive another truck 189 for unloading.

When the need for the agricultural transfer table 1 is finished at the transfer station, the jack 13 is operated to raise the front end 15. The cross pins 127 are reinserted into the ramp lugs 115, and the ramps 103 are rotated to their storage locations by means of the winches 132 and cables 134. The tongue 11 closed, and the hitch block 71 is re-locked to the arms 69. The open guard 56 or 56A is swung to its operative position. The agricultural transfer table is then ready to be towed to a new transfer station.

In summary, the results and advantages of agricultural harvesting machinery, trucks, silo loaders, and other high production agricultural equipment can now be more fully realized. The agricultural transfer table 1 provides both flexibility in choosing locations for transfer stations as well as rapid and efficient transfer of harvested material from a truck 189 to a silo. This desirable result comes from using the combined functions of the tongue 11 and the jack 13. The tongue is closeable to enable the agricultural transfer table to be pulled to the transfer station by a towing vehicle 99. The tongue is also openable to enable the jack to retract and thereby tilt the bed front end 15 toward the ground 9. When the bed is tilted, the ramps 103 are rotated to their working locations, with their bottom edges 107 resting on the ground. A large truck 189 then backs onto the ramps and dumps its load into the box 5.

The engine 175 and hydraulic system 177 drive the apron chains 19, cross chains 25, and beater system 133 to rapidly but controllably discharge the material out the cutout 54 on the selected side of the agricultural transfer table. When the agricultural transfer table is no longer needed, the jack is extended, and the tongue is closed. After the ramps have been rotated back to their storage locations, the agricultural transfer table is ready to be towed to a different transfer station.

In addition to the superior performance of the agricultural transfer table 1, its construction and operation are such as to cost little, if any, more than traditional equipment for transferring harvested agricultural material from a field to a silo or other storage location. In fact, an investment in the agricultural transfer table is quickly recovered because of the reduced costs associated with the transfer process. Also, because the agricultural transfer table is made as a simple design and with rugged components, the need for maintenance is minimal.

Thus, it is apparent that there has been provided, in accordance with the invention, an agricultural transfer table that fully satisfies the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

We claim:

1. An agricultural transfer table for agricultural materials comprising:
   a. a box having front and back ends and opposed sides of predetermined height;
   b. means for supporting the box back end off the ground proximate the box back end;
   c. means for towing the box at the front end thereof over the ground;
   d. means for supporting the box off the ground between the box front and back ends and for selectively tilting the box such that the front end thereof is closer to the ground than the back end without affecting the means for supporting the box back end; and
   e. means for discharging agricultural material out a selected one or other side of the box proximate the box back end, said means for discharging agricultural material further comprises;
      i. a prime mover mounted to the means for supporting the box back end;
      ii. a hydraulic system mounted to the means for supporting the box back end and driven by the prime mover;
      iii. first means for propelling agricultural material toward the box back end in response to operating the prime mover and hydraulic system, said first means driven by the prime mover; and
      iv. second means for discharging agricultural material out a selected one or other box sides in response to operating the hydraulic system.

2. The agricultural transfer table of claim 1 wherein the box comprises:
   a. a bed that defines a bed plane;
   b. side walls upstanding from opposed sides of the bed;
   c. an extension on each side wall at the box back end, each extension defining a cutout therethrough;
   d. a back wall between the extensions;
   e. a cross bed between the extensions and proximate the back wall and aligned with the cutouts in the extensions; and
   f. means for selectively guarding the cutouts in the extensions.

3. The agricultural transfer table of claim 2 wherein the means for towing the box comprises a tongue lying in a plane that is substantially entirely parallel to the bed plane and that is selectively closeable to enable a vehicle to tow the box, and openable to enable the means for supporting the box off the ground between the box front and back ends and for selectively tilting the box to tilt the box front end downwardly toward the ground.

4. The agricultural transfer table of claim 1 wherein the box front end is open for substantially the full predetermined height of the sides.

5. The agricultural transfer table of claim 1 wherein the box comprises:
  a. a bed;
  b. side walls upstanding from the opposed sides of the bed;
  c. an extension on each side wall at the back end of the box, each extension having a bottom edge that is closer to the ground than the bed;
  d. a back wall between the extensions; and
  e. a cross bed between the extensions and proximate the back wall.

6. The agricultural transfer table of claim 5 wherein:
  a. each extension defines a cutout therethrough aligned with the cross bed; and
  b. the agricultural transfer table further comprises:
    i. a bottom wall between the extensions and under the cross bed; and
    ii. a pair of guards each having a first panel hinged to the bottom wall and a second panel generally at a right angle to the first panel, each guard being swingable to an operative position whereat the second panel thereof covers a substantial portion of the cutout in the associated extension, and an open position whereat the guard uncovers the cutout in the associated extension.

7. The agricultural transfer table of claim 1 wherein:
  a. the means for supporting the box back end comprises a chassis having front and back ends that support the box, and wheels that support the chassis back end off the ground; and
  b. the means for supporting the box off the ground between the box front and back ends and for selectively tilting the box front end comprises a jack pivotally mounted to the chassis proximate the front end thereof for contacting the ground and for supporting the chassis front end off the ground, the jack being operable between an extended position whereat the bed front end is at a predetermined distance above the ground, and a retracted position whereat the box front end is less than the predetermined distance above the ground, wherein operation of the jack has no effect on the wheels.

8. The agricultural transfer table of claim 7 wherein the jack comprises:
  a. a beam having a first end pivotally mounted to the chassis, and a second end;
  b. a plate on the beam second end and in contact with the ground; and
  c. means for pivoting the beam about its first end.

9. The agricultural transfer table of claim 7 wherein the means for towing the box comprises:
  a. first and second arms having respective first ends that are connected to the chassis for pivoting the arms between open and closed positions, and respective second ends; and
  b. a hitch block selectively removable from and interlockable to the arms second ends when the arms are in the closed position, the box being towable by means of the hitch block when the arms are interlocked thereto, the arms being pivotable to lie alongside the chassis when the hitch block is removed from the arms second ends.

10. The agricultural transfer table of claim 1 further comprising a beater system turnable in response to operating the prime mover and the hydraulic system to aid in discharging the agricultural material.

11. The agricultural transfer table of claim 10 wherein the beater system comprises a plurality of beaters each turnable at a different speed.

12. The agricultural transfer table of claim 1 further comprising means for enabling a truck to dump a load of agricultural material into the box when the box front end is tilted toward the ground.

13. The agricultural transfer table of claim 1 further comprising a pair of ramps at the box front end, each ramp being hinged to the box for rotating about a respective axis that is immovable relative to the box between a storage location whereat the ramp is substantially inside the box and a working location whereat the ramp is outside of the box and rests on the ground, each ramp having a wheel support section that supports the wheels of a truck to enable the truck to back up the ramp and dump a load of agricultural material into the box.

14. An agricultural transfer table comprising:
  a. a box having front and back ends and opposed sides of predetermined height, said box further comprises:
    i. a bed that defines a bed plane;
    ii. side walls upstanding from opposed sides of the bed;
    iii. an extension on each side wall at the box back end, each extension defining a cutout therethrough;
    iv. a back wall between the extensions;
    v. a cross bed between the extensions and proximate the back wall and aligned with the cutouts in the extensions; and
    vi. means for selectively guarding the cutouts in the extensions;
  b. means for supporting the box back end off the ground proximate the box back end, said means for supporting the box back end comprises a chassis that supports the box; and
  c. means for towing the box at the front end thereof over the ground;
  d. means for supporting the box off the ground between the box front and back ends and for selectively tilting the box such that the front end thereof is closer to the ground than the back end without affecting the means for supporting the box back end; and
  e. means for discharging agricultural material out a selected one or other side of the box proximate the box back end, said means for discharging agricultural material comprises;
    i. a hydraulic system mounted to the chassis;
    ii. a prime mover mounted to the chassis for driving the hydraulic system;
    iii. apron chains for propelling the agricultural material along the bed to the cross bed in response to operating the prime mover and hydraulic system; and
    iv. cross chains for propelling agricultural material along the cross bed and out the cutout of a selected one or other of the box side walls in response to operating the prime mover and the hydraulic system.

15. The agricultural transfer table of claim 14 wherein the hydraulic system comprises:
  a. a first hydraulic motor driven by the hydraulic system for operating the apron chains; and
  b. a second hydraulic motor driven by the hydraulic system for operating the cross chains.

16. The agricultural transfer table of claim 15 further comprising:
  a. a third hydraulic motor driven by the hydraulic system for turning a first beater; and
  b. means for turning at least one second beater at a faster speed than the first beater in response to turning the first beater.

17. An agricultural transfer table for agricultural materials comprising:
   a. a box having front and back ends and opposed sides of predetermined height;
   b. means for supporting the box back end off the ground proximate the box back end;
   c. means for towing the box at the front end thereof over the ground;
   d. means for supporting the box off the ground between the box front and back ends and for selectively tilting the box such that the front end thereof is closer to the ground than the back end without affecting the means for supporting the box back end;
   e. means for discharging agricultural material out a selected one or other side of the box proximate the box back end; and
   f. a pair of ramps at the box front end, each ramp being hinged to the box for rotating about a respective axis that is immovable relative to the box between a storage location whereat the ramp is substantially inside the box and a working location whereat the ramp is outside of the box and rests on the ground, each ramp having a wheel support section that supports the wheels of a truck to enable the truck to back up the ramp and dump a load of agricultural material into the box, wherein
      i. each ramp defines a slot;
      ii. each ramp is rotatable about a fixed pin that passes through the slot; and
      iii. each ramp slot is slideable past the associated fixed pin to thereby enable the ramp to accommodate different amounts of box tilt and uneven contours of the ground.

18. An agricultural transfer table for agricultural materials comprising:
   a. a box having front and back ends and opposed sides;
   b. means for supporting the box back end off the ground;
   c. means for towing the box over the ground;
   d. means for selectively tilting the box front end toward and away from the ground;
   e. means for discharging agricultural material out a selected one or other side of the box;
   f. pair of ramps at the box front end, each ramp being rotatable between a storage location whereat the ramp is substantially inside the box and a working location whereat the ramp is outside of the box and rests on the ground, each ramp having a wheel support section that supports the wheels of a truck to enable the truck to back up the ramp and dump a load of agricultural material into the box, wherein:
      i. each ramp defines a slot;
      ii. each ramp is rotatable about a fixed pin that passes through the slot; and
      iii. each ramp slot is slideable past the associated fixed pin to thereby enable the ramp to accommodate different amounts of box tilt and uneven contours of the ground; and
   g. a cross pin in operative association with each slot, each cross pin being selectively insertable into the ramp and through the associated slot to capture the associated fixed pin against an end of the slot to enable the ramp to be rotated about the fixed pin, and removable from the ramp to enable the slot to slide past the fixed pin.

19. An apparatus for transferring material from a wheeled vehicle to a selected conveying implement comprising:
   a. a box having a bed, front and back ends, and opposed sides;
   b. means for supporting the box proximate the back end thereof at a first selected distance above the ground comprising a chassis for mounting the box bed thereto;
   c. means for towing the box at the front end thereof to a selected transfer station;
   d. means for supporting the box between the front and back ends thereof and for selectively locating the box front end at a second distance above the ground equal to or less than the first selected distance;
   e. means for enabling a wheeled vehicle to dump material into the box at the front end thereof when the box front end is at the second selected distance above the ground, wherein the means for enabling a wheeled vehicle to dump material comprises a pair of ramps hinged to the chassis for rotating about respective axes that are stationary relative to the box between a working location wherein the ramps are outside the box and in contact with the ground and a wheeled vehicle is drivable up the ramp and is partially inside the box, and a storage location wherein the ramps are substantially inside the box;
   f. means for discharging the material out of a selected one or other side of the box proximate the box back end;
   g. a pair of spaced parallel plates having top, bottom, and back edges, each plate defining a slot that is generally parallel to the back edge thereof and that has first and second ends;
   h. a plurality of cross pieces that tie the top edges of the plates to each other; and
   i. a pin fixed to the chassis and passing through the slots of the plates, the ramps being rotatable about the associated fixed pins passing through the ramps slots.

20. The apparatus of claim 19 wherein the box front end is open.

21. The apparatus of claim 19 wherein:
   a. the box further comprises:
      i. left and right side walls upstanding from the bed each being in operative association with a respective left and right extension having respective cutouts therethrough;
      ii. a back wall between the right and left extensions;
      iii. a cross bed between the left and right extensions in alignment with the cutouts therethrough; and
   b. the means for discharging the material comprises:
      i. apron chains for propelling the material along the bed to the cross bed;
      ii. cross chains that cooperate with the cross bed to discharge the material through the cutout in the selected one or other of the left and right extensions; and
      iii. means for driving the apron chains and the cross chains.

22. The apparatus of claim 21 further comprising means for selectively covering and uncovering the cutouts in the left and right extensions.

23. The apparatus of claim 21 wherein:
   a. the means for supporting the box comprises a chassis for fixedly mounting the bed thereto; and
   b. the means for driving the apron chains and the cross chains comprises:
      i. a prime mover mounted to the chassis; and
      ii. a hydraulic system mounted to the chassis and driven by the prime mover for operating the apron chains and cross chains.

24. The apparatus of claim 23 wherein the means for discharging the material further comprises a beater system turnable in the box in response to operating the prime mover and hydraulic system.

25. The apparatus of claim 24 wherein:
  a. the beater system comprises at least one beater turnable in the box; and
  b. the hydraulic system comprises:
    i. a first hydraulic motor connected to the apron chains;
    ii. a second hydraulic motor connected to the cross chains; and
    iii. a third hydraulic motor connected to the beater system.

26. The apparatus of claim 25 wherein:
  a. the third hydraulic motor is connected to a first beater of the beater system; and
  b. a drive train connects the first beater to at least one second beater for turning said at least one second beater at a different speed than the first beater.

27. The apparatus of claim 19 wherein the box further comprises:
  a. left and right side walls upstanding from the bed;
  b. left and right extensions on the left and right side walls, respectively, at the box back end, each extension having a cutout therethrough;
  c. a back wall between the right and left extensions;
  d. a cross bed between the left and right extensions in alignment with the extensions cutouts; and
  e. a guard in operative association with each side wall cutout, each guard being swingable between an operative position whereat it covers at least a portion of the associated cutout, and an open position whereat it completely uncovers the associated cutout.

28. The apparatus of claim 19 wherein:
  a. the means for supporting the box proximate the back end thereof at a first selected distance above the ground comprises:
    i. a chassis having front and back ends that fixedly mounts the box thereto; and
    ii. wheels that support the chassis back end off the ground; and
  b. the means for supporting the box between the front and back ends thereof and for selectively locating the box front end at a second distance above the ground equal to or less than the first selected distance comprises a jack between the wheels and the box front end that supports the chassis front end off the ground.

29. The apparatus of claim 28 wherein the jack is operable between an extended position such that the bed is generally parallel to the ground, and a retracted position such that the box front end is tilted toward the ground and closer thereto than the box back end.

30. The apparatus of claim 28 wherein the means for towing comprises a tongue at the chassis front end that is openable and closeable, the tongue comprising:
  a. first and second arms having respective first ends that are connected to the chassis for pivoting relative thereto, and respective second ends;
  b. a hitch block; and
  c. a plurality of pins for interlocking the hitch block to the arms second ends such that the tongue is closed and the box is enabled to be towed to a selected transfer station, the pins being removable from at least one arm to thereby enable the arms to pivot such that the second ends thereof underlie the bed and thereby enable a wheeled vehicle to approach the box front end and dump material into the box.

31. The apparatus of claim 19 wherein the means for towing the box comprises a tongue that is connected to the means for supporting the box and is openable to enable a wheeled vehicle to dump material into the box, and closeable to enable the box to be towed.

32. The apparatus of claim 19 wherein the means for enabling a wheeled vehicle to dump material comprises at least one ramp hinged to the box, said at least one ramp being rotatable to a working location whereat said at least one ramp is in contact with the ground and a wheeled vehicle is drivable up the ramp and is partially inside the box, and a storage location whereat said at least one ramp is substantially inside the box.

33. Apparatus for transferring material from a wheeled vehicle to a selected conveying implement comprising:
  a. a box having a bed, front and back ends, and opposed sides;
  b. means for supporting the box on the ground;
  c. means for towing the box to a selected transfer station;
  d. means for enabling a wheeled vehicle to dump material into the box at the front end thereof;
  e. means for discharging the material out of a selected one or other side of the box proximate the box back end, wherein:
    i. the means for supporting the box comprises a chassis for mounting the box thereto; and
    ii. the means for enabling a wheeled vehicle to dump material comprises a pair of ramps hinged to the chassis for rotating between a working location whereat the ramps are outside the box and in contact with the ground and a wheeled vehicle is drivable up the ramp and is partially inside the box, and a storage location wherein the ramps are substantially inside the box, wherein each ramp comprises:
  a pair of spaced parallel plates having top, bottom, and back edges, each plate defining a slot that is generally parallel to the back edge thereof and that has first and second ends;
  a plurality of cross pieces that tie the top edges of the plates to each other; and
  a pin fixed to the chassis and passing through the slots of the plates, so that the ramps are rotatable about the associated fixed pins passing through the ramps slots; and
  f. a cross pin removably insertable through each ramp plate and associated slot proximate the slot first end to removably capture the fixed pin between the cross pin and the slot first end,
  so that the ramps do not slide past the fixed pins when the cross pins are inserted through the ramp plates and slots and the ramps are rotated between the storage and working locations thereof.

* * * * *